US005919497A

United States Patent [19]

Kofahl

[11] Patent Number: 5,919,497

[45] Date of Patent: Jul. 6, 1999

[54] SIMPLIFIED APPARATUS FOR FORMING BUILDING BLOCKS

[75] Inventor: Joachim Kofahl, Boksburg, South Africa

[73] Assignee: Hydraform Developments (PTY) Ltd., Johannesburg, South Africa

[21] Appl. No.: 08/895,784

[22] Filed: Jul. 17, 1997

Related U.S. Application Data

[60] Continuation-in-part of application No. 08/821,711, Mar. 19, 1997, which is a division of application No. 08/397,630, Mar. 1, 1995, abandoned.

[51] Int. Cl.[6] .......... B29C 43/00

[52] U.S. Cl. .......... 425/416; 425/422; 425/444

[58] Field of Search .......... 425/218, 416, 425/422, 444, 406, 158; 264/119, 293, 296

[56] References Cited

U.S. PATENT DOCUMENTS

| | | |
|---|---|---|
| 73,610 | 1/1868 | Jordan . |
| 113,300 | 4/1871 | Hutchinson . |
| 1,253,405 | 1/1918 | McNeil . |
| 1,371,656 | 3/1921 | Whitney . |
| 1,822,939 | 9/1931 | Stout . |
| 2,818,603 | 1/1958 | Dunbar . |
| 2,962,788 | 12/1960 | Ramirez . |
| 3,129,464 | 4/1964 | Heider . |
| 3,407,433 | 10/1968 | Beebee et al. . |
| 4,406,606 | 9/1983 | Sangree . |
| 5,277,570 | 1/1994 | Siggers . |

FOREIGN PATENT DOCUMENTS

| | | |
|---|---|---|
| 0 011 060 A1 | 5/1980 | European Pat. Off. . |
| 0 277 452 A1 | 8/1988 | European Pat. Off. . |
| 401828 | 9/1909 | France . |
| 119206 | 9/1918 | United Kingdom . |
| 138044 | 1/1920 | United Kingdom . |
| 152784 | 10/1920 | United Kingdom . |
| 273445 | 7/1927 | United Kingdom . |
| 1367215 | 9/1974 | United Kingdom . |

*Primary Examiner*—Tim Heitbrink
*Attorney, Agent, or Firm*—Townsend and Townsend and Crew LLP

[57] ABSTRACT

Apparatus for forming building blocks comprises an upright compression chamber with an upper end which serves both as an inlet and an outlet. A sliding gate closes the inlet/outlet. A soil/cement mixture is loaded into the upper end of the compression chamber, the gate is slid shut, and a ram then compresses the mixture against the gate. The gate is opened while the ram is still under pressure, smoothing the upper end of the block, and allowing it to be ejected through the common inlet/outlet.

10 Claims, 2 Drawing Sheets

SIMPLIFIED APPARATUS FOR FORMING BUILDING BLOCKS

CONTINUATION DATA FOR RELATED APPLICATIONS

This application is a continuation-in-part of U.S. patent application Ser. No. 08/821,711, filed Mar. 19, 1997, which is a file wrapper divisional of U.S. patent application Ser. No. 08/397,630, filed Mar. 1, 1995, now abandoned.

BACKGROUND OF THE INVENTION

THIS invention relates to apparatus for forming blocks such as building blocks.

Various different machines for forming building blocks are known. Some of these machines use a hydraulic ram to compress a soil/cement mixture in a compression chamber to form a building block. Other machines use non-hydraulic mechanisms to compress the soil/cement mixture.

Although the hydraulic machines are usually relatively quick in operation, they are relatively complicated and expensive. On the other hand, although mechanical machines may be relatively inexpensive and simple to manufacture, their throughput is substantially low.

It is an object of the invention to provide an alternative apparatus for forming building blocks.

SUMMARY OF THE INVENTION

According to the invention apparatus for forming blocks comprises:

an upright compression chamber having first and second opposed ends, with a common inlet and outlet at the first, upper end thereof;

a ram movable between an extended position in which it extends into the compression chamber towards the first end thereof, and a retracted position towards the second end thereof; and a gate slidable transversely relative to the axis of travel of the ram to close off the common inlet and outlet of the compression chamber, so that the compression chamber can be filled with particulate material to be compressed and a block formed therefrom can be ejected via the common inlet and outlet.

The ram may be arranged to be driven by a first hydraulic cylinder disposed below the second end of the compression chamber.

The gate is preferably arranged to be driven by a second hydraulic cylinder disposed adjacent to the first end of the compression chamber.

The gate may comprise a plate having an inner surface defining an end wall of the compression chamber and being slidable in grooves or channels at the first end of the compression chamber.

Preferably, the ram is arranged to apply force to the particulate material in the compression chamber while the gate is opened after compression of the particulate material.

The inner surface of the plate is preferably formed with inclined shoulders at opposed edges thereof, so that sliding movement of the gate forms opposed bevelled edges on the adjacent end surface of a building block in the compression chamber.

The outer surface of the ram preferably has inclined shoulders at opposed edges thereof, so that it forms opposed bevelled edges on the adjacent end surface of a building block in the compression chamber.

The compression chamber may be supported on a free-standing frame.

The frame may include at least one lifting formation engageable by conventional lifting means such as a hydraulic boom.

Wheels may be fitted to the frame to allow towing of the apparatus.

The frame may support a hydraulic pump which is arranged to be driven from the power take-off of a tractor or another power source.

DESCRIPTION OF THE PREFERRED EMBODIMENT

Figure 3:
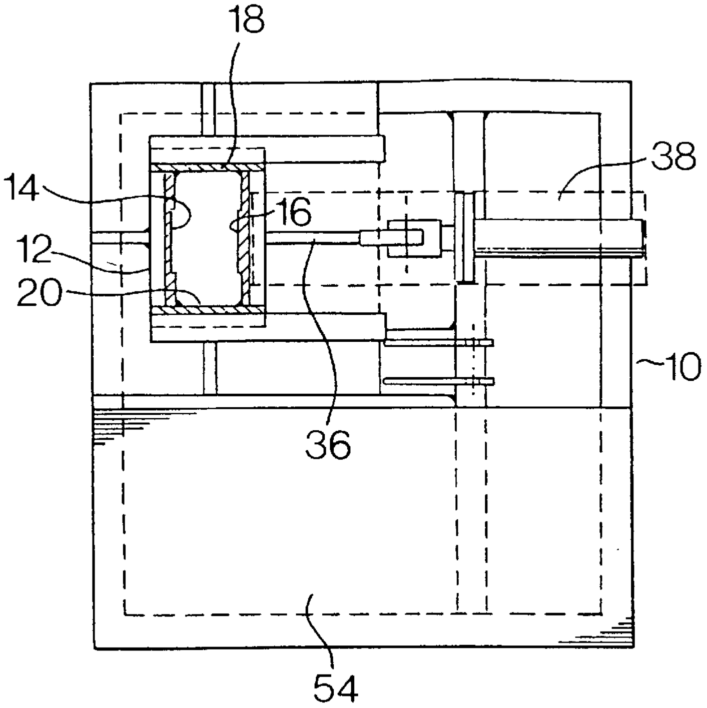
FIG. 3 a partial sectional plan view of the apparatus of FIGS. 1 and 2.

The illustrated apparatus comprises a frame 10 built from steel channel sections which support an upright compression chamber 12 constructed from steel plate. As best seen in FIG. 3, the compression chamber 12 is generally rectangular in section, and is provided with hard metal wear plates 14, 16, 18 and 20 on its inner surface, which define the exact shape of the sides of a building block to be formed.

A ram 22 is fitted to the piston rod 24 of a hydraulic cylinder 26 which is supported by the frame 10 below the compression chamber 12, and is arranged to slide axially in the compression chamber from the lowermost end of the compression chamber to its uppermost end. At the upper end of the compression chamber is a sliding gate 28 of heavy steel plate which has an inner surface 30 defining the upper end wall of the compression chamber and which is retained by grooves or channels 32 and 34 in the metal body 12 of the compression chamber.

Figure 2:
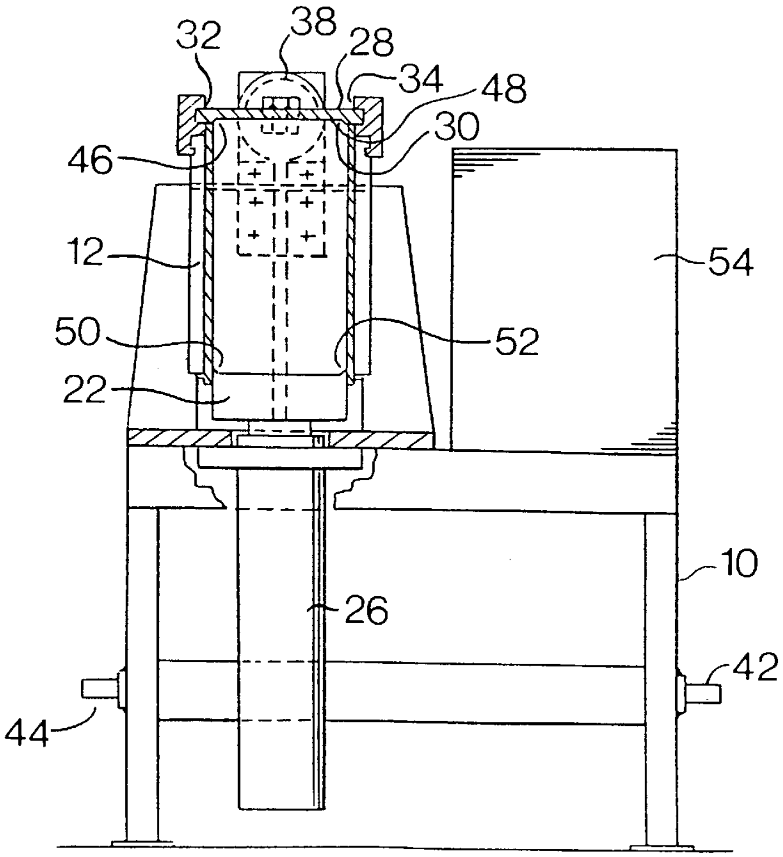
FIG. 2 is a partial sectional end view of the apparatus of FIG. 1.

As best seen in FIG. 2, the inner surface 30 of the sliding gate 28 has two opposed parallel inclined shoulders 46 and 48 at opposite sides thereof, which are designed to form a bevelled edge on a first end of the finished building block, rather than sharp rectangular corners. Similarly, the ram 22 has opposed parallel inclined shoulders 50 and 52 at its opposite edges, which form bevels in the edges of the other end of the finished building block. This is important to prevent crumbly edges in the finished block, due to a drop in the pressure distribution towards the edges of the block as it is being formed.

Figure 1:
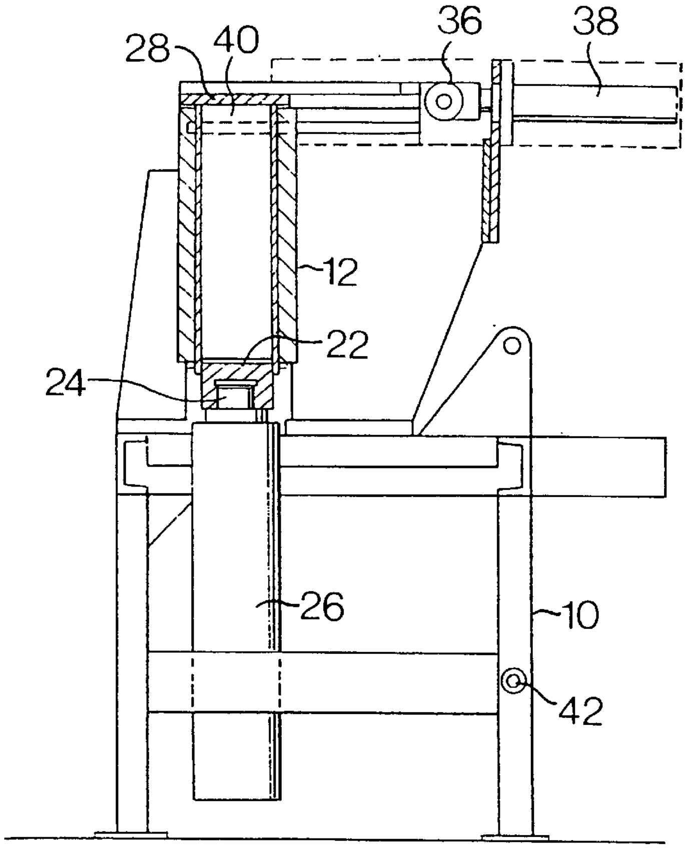
FIG. 1 is a partial sectional side view of apparatus for forming building blocks according to the invention.

The gate 28 is connected via a linkage 36 to a second, smaller hydraulic cylinder 38, which is operable to move the gate between the closed position shown in FIGS. 1 and 2, and an open position in which the interior of the compression chamber is exposed via an inlet/outlet 40.

In use, the ram 22 is retracted fully, as illustrated in FIGS. 1 and 2, and the gate 28 is slid open, exposing the interior of the compression chamber, allowing it to be filled with a soil/cement mixture or another suitable mixture for forming a building block. The gate is then closed by operation of the hydraulic cylinder 38, and the hydraulic cylinder 26 is then operated to force the ram 22 upwardly in the compression chamber, compressing the soil/cement mixture and forming a solid block.

Once the soil/cement mixture in the compression chamber has been pressurized to the required extent, the gate 28 is retracted rapidly while the hydraulic cylinder 26 is fully pressurized, so that the inner surface 30 of the gate 28 slides over the upper end of the block under pressure. This creates an "extrusion" effect, smoothing the upper end surface of the block. This is particularly important in the case of mixtures which are somewhat elastic (such as mixtures containing clay), which do not transmit the full pressure applied by the ram 20 uniformly throughout the soil/cement mixture. This can result in slightly soft and porous edges at the upper end of the block. However, by opening the gate 28 relatively rapidly while the newly formed block is under pressure applied by the ram 22, the resulting extrusion effect provides smooth edge surfaces at the upper end of the finished block.

The speed at which the gate 28 opens can be adjusted by means of a restriction valve in the hydraulic line (not shown) to the auxiliary hydraulic cylinder 38. This allows the speed of opening of the gate to be adjusted between approximately 0.1 m/s to approximately 1 m/s. Generally, the faster the speed of opening of the gate 28, the smoother will be the edges of the upper end of the finished block.

The characteristics of the finished block are, of course, influenced by the pressure applied by the ram 22. In a prototype apparatus, the ram and its associated hydraulic cylinder were selected to allow a maximum force of 50 tons to be exerted by the ram. A pressure release valve (see below) is used to set an appropriate force/pressure setting for the mixture being used. The drier the mix, the greater is the pressure required to obtain satisfactory results.

Because the inlet/outlet 40 at the upper end of the compression chamber serves a dual purpose and is controlled by a single gate, only one further auxiliary hydraulic cylinder 38 is required in addition to the main hydraulic cylinder 26 for the ram 22. In addition, the fact that the compression chamber 12 is filled from the top ensures consistent filling of the compression chamber and effective distribution of the mixture therein, without the need for a sophisticated hopper or feeding system. This assists in loading consistent volumes of mix, with resulting consistent block size. Thus, the described apparatus operates efficiently and quickly, but is relatively simple to construct and therefore less expensive than other, more complicated apparatus of the same general type.

The frame 10 is provided with lifting pins 42 and 44 on its upright legs which enable the apparatus to be lifted by a hydraulic boom or other lifting apparatus on a tractor. This allows easy transporting of the apparatus. The frame can also be provided with wheels to allow easy transportation and towing thereof. In addition, the apparatus is preferably powered by a conventional power take-off of a tractor, with a hydraulic pump and a reduction gearbox (indicated schematically by the reference numeral 54) being mounted on the frame for this purpose. Alternatively, an electric motor or small engine can be mounted on the frame to drive the pump/gearbox 54.

Figure 4:
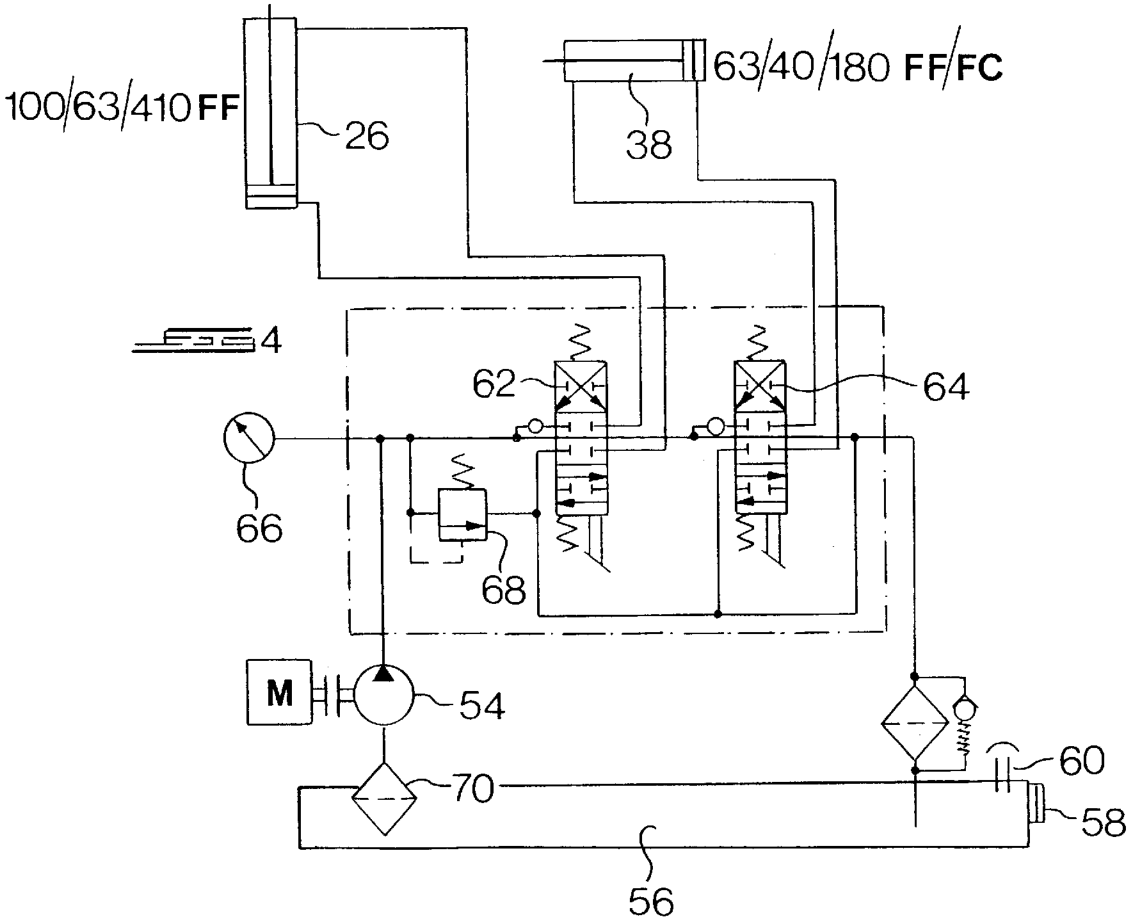
FIG. 4 is a schematic diagram of a hydraulic control circuit of the apparatus.

FIG. 4 shows a hydraulic control system for the above described apparatus. The control system comprises a sump 56 for hydraulic fluid, which in the prototype apparatus comprised a 1401 tank. The tank is provided with an oil level indicator 58 and a breather outlet 60. The pump/gearbox 54 is shown coupled to a drive "M" which, as described above, can be a tractor power take-off or a dedicated motor. A filter or strainer 70 connected to the inlet of the pump protects the hydraulic circuit from contaminants in the tank 56.

The output of the pump is connected to first and second manual control valves 62 and 64 and to a pressure gauge 66.

The valve 62 controls the main hydraulic cylinder 26 which powers the ram 22, while the valve 64 controls the auxiliary hydraulic cylinder 38 which controls the gate 28. An adjustable pressure control valve 68 is provided to regulate the maximum output pressure of the valve 62, thus determining the force/pressure applied by the ram 22 in use.

The hydraulic circuit is completed by a return line to the sump 56 with a filter 20 (See FIG. 3).

Operation of the control valve 62 actuates the hydraulic cylinder 26 to raise and lower the ram 22 in the compression chamber, while operation of the valve 64 actuates the hydraulic cylinder 38 to open and close the gate 28 at the top of the compression chamber. The normal sequence of operation of the apparatus is as follows:

After ejection of a block, the gate 28 is opened fully and the ram 22 is fully raised.

The valve 62 is operated to lower the ram.

The compression chamber is filled with a soil/cement mixture.

The valve 64 is operated to close the gate 28. If the compression chamber is overfilled, the gate cuts through the excess material, ensuring that the chamber is filled to the correct volume, thus ensuring a block of substantially constant length.

The valve 62 is operated to raise the ram to compress the soil/cement mixture, with the force applied by the ram and thus the pressure in the compression chamber being adjusted by the pressure control valve 68.

After compression of the block, the valve 62 is operated to lower the ram 22 slightly and thus to partially relieve the pressure in the compression chamber.

The valve 64 is operated to open the gate 28, with sufficient pressure being retained in the compression chamber to ensure that the upper end of the newly formed block contacts the underside of the gate with a desired force/pressure, resulting in the above mentioned "extrusion effect".

With the gate 28 fully opened, the valve 62 is operated to raise the ram fully, to eject the block.

The above described control system can be operated successfully by a relatively unskilled operator with some experience. Because the degree of pressure between the upper end of the newly formed block and the underside of the gate 28 (which is necessary to obtain the desired smooth finish on the upper end of the block) will vary according to the characteristics of the soil/cement mixture used, manual control of the pressure in the compression chamber during opening of the gate 28 enables a reasonably skilled operator to compensate for such variations. However, it will be appreciated that the pressure adjustment valve 68 or an auxiliary pressure control valve can be used to preset a secondary pressure threshold in the compression chamber which is substantially lower than the maximum pressure created in the compression chamber during the forming of the block, to enable a less skilled operator to achieve acceptable results.

What is claimed is:

1. Apparatus for compressing a particulate soil/cement mixture into a block comprising:

an upright compression chamber having upper and lower opposed ends, with a common inlet and outlet at the upper end thereof;

a ram moveable between an extended position in which the ram extends into the compression chamber towards the upper end thereof, and a retracted position towards the lower end thereof;

a gate slidable transversely relative to the axis of the travel of the ram to close off the common inlet and outlet of the compression chamber, so that the compression chamber can be filled with particulate material to be compressed via the common inlet and outlet; and a control system operable to control operation of the ram and the gate such that the ram applies a force to the particulate material in the compression chamber while the gate is opened after compression of the particulate material to obtain a smooth surface at the upper end of the block adjacent the gate.

2. Apparatus according to claim 1 further comprising a first hydraulic cylinder disposed below the lower end of the compression chamber for driving the ram between the extended and retracted portions.

3. Apparatus according to claim 1 further comprising a second hydraulic cylinder disposed adjacent to the upper end of the compression chamber for sliding the gate.

4. Apparatus according to claim 1 wherein the gate comprises a plate having an inner surface defining an end wall of the compression chamber, the plate being slidable in grooves or channels at the upper end of the compression chamber.

5. Apparatus according to claim 4 wherein the inner surface of the plate is formed with inclined shoulders at opposed edges thereof, so that sliding movement of the gate forms opposed bevelled edges on the adjacent end surface of a building block in the compression chamber.

6. Apparatus according to claim 5 wherein the outer surface of the ram has inclined shoulders at opposed edges thereof, so that the forms opposed bevelled edges on the adjacent end surface of a building block in the compression chamber.

7. Apparatus according to claim 1 wherein the compression chamber is supported on a free-standing frame.

8. Apparatus according to claim 7 wherein the frame includes at least one lifting formation engageable by conventional lifting means.

9. Apparatus according to claim 8 wherein the frame is fitted with wheels.

10. Apparatus according to claim 1 wherein the frame supports a hydraulic pump which is arranged to be driven from a power take-off of a tractor or another power source.

* * * * *